United States Patent Office 3,473,933
Patented Oct. 21, 1969

3,473,933
CHEWING GUM COMPOSITION
Yoshinori Sato, 28-6 1-chome, Nishirokugo, Ota-ku, and Yukio Inoue, 35 3-chome, Nakamura, Nerima-ku, both of Tokyo, Japan
No Drawing. Filed Jan. 24, 1967, Ser. No. 611,237
Claims priority, application Japan, Jan. 28, 1966, 41/4,622
Int. Cl. A23g 3/30; C08f 15/00
U.S. Cl. 99—135                     1 Claim

ABSTRACT OF THE DISCLOSURE

A chewing gum base composition comprising a resinous mixture obtained by polymerizing vinyl propionate in the presence of at least one kind of substance among resins such as Chicle resin, Jelutong resin and polyvinyl acetate and additives such as wax, polyisobutylene, disproportionated rosin glycerides, ester gums, emulsifiers and plasticizers. A sweetener and a flavoring material can be also included in the composition.

---

This invention relates to chewing gum base compositions. More particularly the present invention relates to a chewing gum base composition comprising a resinous mixture obtained by polymerizing vinyl propionate under a specific condition and to a chewing gum composition made from it.

For base resins for chewing gum products, there have been mostly used such natural resins as Chicle resin and Jelutong resin. However, as these resins are natural products, they have defects that products of a fixed quality are hard to obtain and that they are costly. On the other hand, polyvinyl acetate has properties considerably similar to those of such natural resins and is a synthetic product. Therefore, it is so easy to obtain a fixed quality of polyvinyl acetate and it is so cheaply available with the development of the synthetic resin industry that polyvinyl acetate is mostly used as a base resin for chewing gum products. However, in the case of using polyvinyl acetate as a base resin for chewing gum products, there will be some of such disadvantages as are mentioned below. Therefore, polyvinyl acetate is not always good enough for such purpose. That is to say, a chewing gum product is obtained by using polyvinyl acetate as a base resin, blending in it such additives for the chewing gum base as calcium carbonate, talc, wax, polyisobutylene, ester gums, emulsifiers and plasticizers so as to be a chewing gum base composition and further mixing with it such sweeteners as sugar and flavoring materials. When the viscosity of the polyvinyl acetate which is the base resin is high, the product will be stiff, will be low in the lift, will absorb saliva while being chewed, will thus become soft and will be sticky in the mouth. On the other hand, when the viscosity is low, the product will be so soft, will absorb saliva while being chewed and will become very soft.

An object of the present invention is to provide a new chewing gum base composition having improved properties.

A further object of the present invention is to provide a chewing gum base composition having no such disadvantages as are described above.

A specific object of the present invention is to provide a chewing gum base composition which can give chewing gum products of an excellent quality which are smooth to the tongue, have a proper lift, are smooth to the teeth and have a pleasant texture and in which the chewing feel varies little from the beginning to the end of chewing.

Another object of the present invention is to provide a chewing gum base composition having features that the stretch is very favorable and that the product prepared specifically for bubble gums is high in the ease of blowing bubbles and in the film-formability.

Other objects of the present invention will become clear from the descriptions in the following specification and claim.

It has now become clear that the above mentioned objects of the present invention can be attained by using as a base composition for chewing gum products a resinous mixture obtained by polymerizing vinyl propionate in the presence of at least one kind of substance among resins and additives for the chewing gum base. That is to say, the chewing gum product made by using said resinous mixture has a proper flexibility, is comparatively hard to absorb saliva while being chewed, little becomes soft or sticky and is therefore much more improved in the chewing feel when chewed and the variation with the lapse of time than any chewing gum product produced by using polyvinyl acetate as a base resin. Further, as the polymerizing reaction of vinyl propionate for the production of said resinous mixture is carried out in the presence of such additives for the chewing gum base as wax, polyisobutylene, disproportionated rosin glycerides, ester gums, emulsifiers and plasticizers and/or such resins for the chewing gum bas as Chicle resin, Jelutong resin and polyvinyl acetate as mentioned above, the respective components in the produced resinous mixture will be blended so closely that the stiffness will become silky, the stretch will be improved and a chewing gum product very excellent in the feel when chewed will be able to be obtained.

It is ideal to carry out the polymerizing reaction of vinyl propionate in the presence of all the desired ingredients of such additives and resins for the chewing gum base as are mentioned above. But, even in the presence of a part of the desired ingredients, there will be a blending effect corresponding to them. Therefore, the present invention shall include also such case in the presence of a part of them. Further, a resinous mixture obtained by polymerizing vinyl propionate in the presence of such resin for the chewing gum base as specifically polyvinyl acetate is so high in the stretch that a product of a bubble gum made from it is high in the ease of blowing bubbles and in the film-formability. In such case, polyvinyl acetate of an intrinsic viscosity (which is measured on an acetone solution at 20° C. and is calculated in a concentration in g./l. and shall be merely known as a viscosity hereinafter) of about 0.005 to 0.057 is proper. Unless the percentage of vinyl propionate to be used on the weight of polyvinyl acetate is at least 10%, there will be obtained no effect of using vinyl propionate. Further, a resinous mixture obtained by polymerizing vinyl propionate in the presence of such additives for the chewing gum base as specifically such emulsifiers as glycerol monostearate, sorbitan monostearate, sorbitan sesquistearate, sorbitan monolaurate, sugar esters, such plasticizers as butyl phthalyl butyl glycolate, dibutyl phthalate, polyethylene glycol, polypropylene glycol, polyhexylene glycol, methyl acetylricinolate and glycerine, wax, polyisobutylene, disproportionated rosin glycerides and ester gums has a specifically favorable lift and flexibility. Therefore, a product prepared as a thick gum is smooth to the tongue and teeth and is pleasant in the texture.

Further, the polymerizing reaction can be easily made to proceed by heating vinyl propionate together with such coexisting ingredients as are mentioned above in the presence of such radical polymerizing catalyst as, for example, acetyl peroxide, lauryl peroxide, benzoyl peroxide or azobisisobutylonitrile with or without using a solvent such as an alcohol, lower alkyl acetate or ketone. However, it is needless to say that not only such polymerizing system but also any known polymerizing system can be adopted. The viscosity of the resin part in such polymerized and produced resinous mixture should be selected to be within the range of about 0.009 to 0.067. When the viscosity is higher than that, the product will be so stiff that the texture when chewed will be bad. On the other hand, when the viscosity is lower than that, the product will be so flexible as to tend to be sticky in the mouth. Thus neither is desirable. In fact, the polymerizing reaction should be carried out so that the resinous mixture may contain a produced resin of a proper viscosity in the above mentioned viscosity range according to the properties required of the product. Generally, it is desirable that the viscosity of the resin of a stick gum (sweet gum) is about 0.009 to 0.035 and that of the resin of a bubble gum is about 0.027 to 0.067.

The thus obtained resinous mixture is heated alone or properly together with a proper amount of any of such additives for the chewing gum base as calcium carbonate, talc, wax, polyisobutylene, disproportionated rosin glycerides, emulsifiers and plasticizers or such resins for the chewing gum as Chicle resin, Jelutong resin and polyvinyl acetate and is uniformly mixed by means of a kneader or Banbury mixer so as to be an object chewing gum base composition. It is desirable that the percentage of the resinous mixture in the chewing gum base composition produced in such case is selected to be at least 10% by weight or specifically 20 to 70% by weight. If it is less than about 10% by weight, substantially no effect of using said resinous mixture will be expected.

The chewing gum composition of the present invention is further mixed with such sweetener as sugar, a proper flavoring material and, as required, a coloring material and is finished to be any of such products as stick gums and bubble gums. The thus obtained product is very good in the feel when chewed as mentioned above.

The present invention shall be explained in detail by giving the following examples. However, they are only to show the manners of working the invention. Thus the present invention is not limited in any way by these examples in which parts are by weight.

Example 1

Into 12 parts of ethanol in a polymerizing kettle provided with a stirrer were added 1 part of calcium carbonate, 3 parts of wax, 2 parts of butyl phthalyl butyl glycolate (plasticizer), 1 part of glycerol monostearate (emulsifier) and 25 parts of vinyl propionate and further acetyl peroxide as a polymerizing catalyst. A polymerizing reaction of the vinyl propionate was then carried out by heating and stirring the mixture. The viscosity of the obtained polyvinyl propionate was 0.023.

The mixture containing the thus obtained polyvinyl propionate and the above mentioned additives for the chewing gum base was transferred to a kneader. To this mixture were added 13 parts of ester gum, 4 parts of calcium carbonate, 12 parts of wax and 2 parts of glycerol monostearate. The mixture was then heated and well kneaded to prepare a chewing gum base composition.

This chewing gum base composition was further mixed with sugar and a flavoring material so as to be a chewing gum.

As a control, in the same manner as in the preceding example except that the polymerizing reaction of vinyl propionate was carried out in the presence of no additives for the chewing gum base, polyvinyl propionate of a viscosity of 0.023 was obtained. 25 parts of this polyvinyl propionate were mixed with 5 parts of calcium carbonate, 15 parts of wax, 13 parts of ester gum, 2 parts of butyl phthalyl butyl glycolate and 3 parts of glycerol monostearate to prepare a chewing gum (control 1).

Further, polyvinyl acetate of a viscosity of 0.023 instead of polyvinyl propionate was mixed in the same manner with the additives for the chewing gum base to prepare a chewing gum (control 2).

The results of the chewing tests of these chewing gum products are shown in Table 1.

TABLE 1

| | Flexibility | Lift | Stretch | Smoothness | Score | Variations of the flexibility and lift during chewing |
|---|---|---|---|---|---|---|
| Example 1 | Excellent | Excellent | Lower excellent | Excellent | 28.5 | Always little varied. |
| Control 1 | Lower excellent | Lower excellent | do | Higher good | 27.0 | Do. |
| Control 2 | Good | Good | Good | Good | 25.0 | Considerably softened in the middle and ending periods. |

NOTE.—The flexibility, lift and other properties in chewing in each of the beginning, middle and ending periods of chewing of a chewing gum prepared in the same manner as in the preceding example except that a natural chicle resin was used as a base resin were investigated and were respectively made 5 points totaling 30 points. The score in the table is a value given by comparing the properties of each sample with them.

Examples 2 to 3

A polymerizing reaction of vinyl propionate was carried out in the same manner as in Example 1 in the presence of an ester gum, dibutyl phthalate (plasticizer), glycerol monostearate, talc, Vistanex and wax. When chewing gums were produced by a normal method from the obtained mixtures containing polyvinyl propionate and chewing tests of them were made, the results in Table 2 were obtained.

TABLE 2

| | Polyvinyl propionate | | Ester gum (parts) | Dibutyl phthalate (parts) | Glycerol monostearate (parts) | Talc (parts) | Vistanex (parts) | Wax (parts) | Results of chewing tests | | | | |
|---|---|---|---|---|---|---|---|---|---|---|---|---|---|
| Ex. No. | Viscosity | Amount of use (parts) | | | | | | | Flexibility | Lift | Stretch | Smoothness | Score |
| 2 | 0.039 | 50 | 20 | 8 | 3 | 9 | 4 | 4 | Lower excellent | Lower excellent | Lower excellent | Lower excellent | 27.5 |
| 3 | 0.034 | 70 | 10 | 11 | 2 | 10 | 2 | 6 | do | Excellent | do | Excellent | 28.0 |

Examples 4 to 6

Polyvinyl propionates having various viscosities were produced by polymerizing vinyl propionate in the presence of calcium carbonate, wax, butyl phthalyl glycolate and sorbitan monostearate (emulsifier). Further, such various chewing gum base compositions as are shown in Table 3 were prepared in the same manner as in Example 1 except that chicle resin was mixed in and chewing gums were made from the respective compositions.

The results of the experiments are shown in Table 3.

TABLE 3

| Example Nos. | Viscosity of vinyl propionate | Amount of use of chicle resin (parts) | Amount of use of butyl-phthalyl butyl-glycolate (parts) | Flexibility | Lift | Stretch | Smoothness | Score | Variations of the flexibility and lift during chewing |
|---|---|---|---|---|---|---|---|---|---|
| 4 | 0.018 | 15 | 4 | Excellent | Excellent | Higher excellent | Excellent | 29.0 | Always little varied. |
| 5 | 0.040 | 15 | 17 | Lower excellent | Lower excellent | Lower excellent | Lower excellent | 27.5 | Do. |
| 6 | 0.057 | 15 | 23 | Higher good | Higher good | Higher good | do | 27.0 | Stiffened a little in the ending period. |
| Control 3 | 0.008 | 5 | 0 | Good | Good | do | Good | 20.5 | Gradually reduced. |
| Control 4 | 0.073 | 15 | 30 | do | Higher good | Good | do | 22.0 | Stiffened in the ending period. |

Examples 7 to 8

When 75 parts of vinyl propionate were polymerized in the presence of 25 parts of Chicle resin, a mixture of a polyvinyl propionate resin of a viscosity of 0.025 and Chicle resin was obtained. This mixture was further mixed with 18 parts of an ester gum, 6 parts of dibutyl phthalate, 4 parts of sorbitan monostearate, 8 parts of calcium carbonate and 18 parts of wax. The thus obtained chewing gum base composition was mixed with sugar and a flavoring material to prepare a chewing gum (Example 7).

Further, experiments were made in the case of using 25 parts of Jelutong resin instead of Chicle resin (Example 8).

with 33 parts of an ester gum, 5 parts of calcium carbonate, 9 parts of wax and 1 part of glycerol monostearate in a kneader to prepare a chewing gum base composition. Further, sugar and a flavoring material were mixed in this base composition to prepare a bubble gum.

Further, as a control, experiments were made in the case that 20 parts of the 41 parts of the above mentioned mixture were replaced with polyvinyl acetate of a viscosity of 0.038 (control 7).

The results of the experiments are shown in Table 5.

TABLE 5

| | Flexibility | Lift | Stretch | Smoothness | Score | Variation of the flexibility and lift during chewing | Film-formability Ease of blowing bubbles | Film of blowing bubbles | Adhesiveness to skin |
|---|---|---|---|---|---|---|---|---|---|
| Example 9 | Excellent | Excellent | Lower excellent | Excellent | 29.0 | Always little varied | Lower excellent | Excellent | None. |
| Control 7 | Good | Higher good | Higher good | Good | 25.0 | Considerably softened in the middle and ending periods. | Good | Good | Some. |

Examples 10 to 12

Chewing gums were prepared in the same manner as in Example 1 except that a part of the polyvinyl propionate obtained in Example 1 was replaced respectively with other base resins for the chewing gums.

The results of the experiments are shown in Table 6.

TABLE 6

| Example Nos. | Amount of use of polyvinyl propionate-containing mixture (parts) | Basin resin Kind | Amount of use (parts) | Flexibility | Lift | Stretch | Smoothness | Score |
|---|---|---|---|---|---|---|---|---|
| 10 | 50 | Chicle | 15 | Higher excellent | Higher excellent | Excellent | Excellent | 29.5 |
| 11 | 50 | Jelutong | 15 | do | Excellent | do | do | 29.0 |
| 12 | 45 | Polyvinyl acetate having a viscosity of 0.023. | 20 | Lower excellent | Higher good | Lower excellent | Lower excellent | 27.5 |

Further, as controls, experiments were made in the case of mixing the respective additives and Chicle resin (control 5) or Jelutong resin (control 6) that in the same manner except that vinyl propionate was polymerized in the absence of Chicle resin and Jelutong resin.

The results of these experiments are shown in Table 4.

TABLE 4

| Example Nos. | Flexibility | Lift | Stretch | Smoothness | Score |
|---|---|---|---|---|---|
| 7 | Higher excellent | Higher excellent | Excellent | Higher excellent | 30.0 |
| 8 | do | Excellent | do | do | 29.5 |
| Control 5 | do | Higher excellent | do | Excellent | 29.0 |
| Control 6 | do | Excellent | do | do | 28.5 |

Example 9

20 parts of vinyl propionate were polymerized in the presence of 3 parts of calcium carbonate, 9 parts of wax, 6 parts of butyl phthalyl butyl glycolate and 3 parts of glycerol monostearate to obtain a mixture containing polyvinyl propionate of a viscosity of 0.038 and the above mentioned additives. This mixture was then mixed

Example 13

20 parts of vinyl propionate were polymerized in the presence of 10 parts of a Chicle resin, 5 parts of butyl phthalyl butyl glycolate, 3 parts of glycerol monostearate and 1 part of wax to obtain a mixture of polyvinyl propionate of a viscosity of 0.035 and the above mentioned respective ingredients. This mixture was further mixed with 38 parts of an ester gum, 1 part of butyl phthalyl butyl glycolate, 1 part of glycerol monostearate, 8 parts of talc, 6 parts of Vistanex and 1 part of wax to prepare a chewing gum base composition. This composition was further mixed with sugar and flavoring material to prepare a bubble gum.

The results of measuring the properties of this bubble gum are shown in Table 7.

TABLE 7

| Flexibility | Lift | Stretch | Smoothness | Score | Variations of the flexibility and lift during chewing | Film-formability | | |
|---|---|---|---|---|---|---|---|---|
| | | | | | | Ease of blowing bubbles | Film strength | Adhesiveness to skin |
| Excellent | Higher excellent. | Higher excellent. | Higher excellent. | 30.0 | Always little varied | Higher excellent. | Excellent | None. |

Examples 14 to 15

Vinyl propionate was polymerized in the presence of polyvinyl acetate of a viscosity of 0.020 to obtain a resin of a viscosity of 0.038. 20 parts of this resin were mixed with 33 parts of an ester gum, 7 parts of butyl phthalyl butyl glycolate, 3 parts of glycerol monostearate, 7 parts of talc, 5 parts of Vistanex and 3 parts of wax in a kneader to prepare a chewing gum base composition. This composition was further mixed with sugar and a flavoring material to prepare a bubble gum.

Further, as a control, experiments were made also in the case that 15 parts of the 20 parts of the above mentioned resin were replaced with polyvinyl acetate of a viscosity of 0.038.

The results of the experiments are shown in Table 8.

TABLE 8

| | Flexibility | Lift | Stretch | Smoothness | Score | Variations of the flexibility and lift during chewing | Film-formability | | |
|---|---|---|---|---|---|---|---|---|---|
| | | | | | | | Ease of blowing bubbles | Film strength | Adhesiveness to skin |
| Example Nos.: | | | | | | | | | |
| 14 | Excellent | Excellent | Excellent | Lower excellent. | 29.5 | Always little varied | Excellent | Excellent | None. |
| 15 | Higher good. | Higher good. | Lower excellent. | do | 26.5 | Decreased in the ending period. | Higher good. | Higher good. | Some. |

Example 16

Vinyl propionate was polymerized in the presence of 5 parts of butyl phthalyl butyl glycolate, 3 parts of glycerol monostearate, 1 part of wax and 15 parts of polyvinyl acetate of a viscosity of 0.025 to obtain a mixture of a resin of a viscosity of 0.037, butyl phthalyl butyl glycolate, glycerol monostearate and wax. This mixture was further mixed with 40 parts of an ester gum, 1 part of butyl phthalyl butyl glycolate, 1 part of glycerol monostearate, 8 parts of talc, 6 parts of Vistanex and 1 part of wax to prepare a chewing gum base composition.

The results of chewing tests of a bubble gum obtained by mixing sugar and a flavoring material in this chewing base composition are shown in Table 9.

TABLE 9

| Flexibility | Lift | Stretch | Smoothness | Score | Variation of the flexibility and lift during chewing | Film-formability | | |
|---|---|---|---|---|---|---|---|---|
| | | | | | | Ease of blowing bubbles | Film strength | Adhesiveness to skin |
| Excellent | Excellent | Excellent | Higher excellent | 30.0 | Always little varied | Excellent | Excellent | None. |

What we claim is:

1. A chewing gum consisting essentially of
   (a) a resinous mixture obtained by polymerizing vinyl propionate in the presence of both resins and additives for the chewing gum base; said resin being a member selected from the group consisting of Chicle resin, Jelutong resin and polyvinyl acetate, and said additive being a member selected from the group consisting of wax, polyisobutylene, disproportionated rosin glycerides, ester gums, emulsifiers and plasticizers,
   (b) a sweetener and
   (c) a flavoring material.

References Cited

UNITED STATES PATENTS

| 2,413,239 | 12/1946 | Manson | 99—135 |
| 3,063,844 | 11/1962 | Meguro et al. | 99—135 |
| 3,156,678 | 11/1964 | Dexheimer et al. | 260—89.1 |

FOREIGN PATENTS

| 834,754 | 5/1960 | Great Britain. |

LIONEL M. SHAPIRO, Primary Examiner

W. C. LAWTON, Assistant Examiner

U.S. Cl. X.R.

260—23, 27, 28.5, 29.6, 89.1, 875